US009001219B2

(12) United States Patent
Sagawa et al.

(10) Patent No.: US 9,001,219 B2
(45) Date of Patent: Apr. 7, 2015

(54) IMAGE PROCESSING APPARATUS CONFIGURED TO DETECT OBJECT INCLUDED IN IMAGE AND METHOD THEREFOR

(75) Inventors: Naotsugu Sagawa, Tokyo (JP); Kazuyo Ikeda, Yokohama (JP); Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/093,741

(22) Filed: Apr. 25, 2011

(65) Prior Publication Data
US 2011/0267489 A1    Nov. 3, 2011

(30) Foreign Application Priority Data

Apr. 30, 2010    (JP) ................. 2010-105672

(51) Int. Cl.
*H04N 5/228* (2006.01)
*H04N 5/232* (2006.01)
*H04N 1/00* (2006.01)
*G06K 9/32* (2006.01)
*G06T 7/20* (2006.01)

(52) U.S. Cl.
CPC ....... *H04N 5/23219* (2013.01); *H04N 1/00684* (2013.01); *G06K 9/3233* (2013.01); *G06T 7/2033* (2013.01); *G06T 2207/30201* (2013.01)

(58) Field of Classification Search
CPC .................................. H04N 1/00684

USPC ............... 348/169, 222.1; 382/103, 190
See application file for complete search history.

(56) References Cited

U.S. PATENT DOCUMENTS

| 8,189,051 B2* | 5/2012 | Shih et al. ............. 348/169 |
| 2006/0104487 A1* | 5/2006 | Porter et al. .............. 382/118 |
| 2006/0115157 A1* | 6/2006 | Mori et al. ............... 382/190 |
| 2008/0186386 A1* | 8/2008 | Okada et al. ............ 348/208.4 |

FOREIGN PATENT DOCUMENTS

| JP | 9-107551 A | | 4/1997 | |
| JP | 9-212648 A | | 8/1997 | |
| JP | 2009/017194 | * | 1/2009 | ........... G06T 1/00 |
| JP | 2009-17194 A | | 1/2009 | |

* cited by examiner

*Primary Examiner* — Roberto Velez
*Assistant Examiner* — Stephen Coleman
(74) *Attorney, Agent, or Firm* — Canon USA Inc IP Division

(57) ABSTRACT

An image processing apparatus acquires a plurality of input images which are serially photographed, detects a plurality of object regions from each input image, and associates object regions in a past input image with object regions in a current input image. If any object region that has not been appropriately associated exists in the object regions detected from the past input image, the apparatus calculates object region movement information for each size of the object region based on the object regions mutually associated between the past input image and the current input image, and estimates a position of the object region of the current input image that has not been associated based on the movement information for each size of the object region and a size of the object region that has not been associated.

9 Claims, 20 Drawing Sheets

FIG. 5

| FACE ID OF FACE IN PREVIOUS FRAME | FACE ID OF FACE IN CURRENT FRAME |
|---|---|
| fp1 | fi1 |
| fp2 | fi2 |
| fp3 | fi3 |
| fp4 | fi4 |
| fp5 | fi5 |
| fp6 | fi6 |
| fp7 | fi7 |
| fp8 | fi8 |

FIG. 6

| FACE ID OF FACE IN PREVIOUS FRAME | FACE ID OF FACE IN CURRENT FRAME | COORDINATES OF CENTER OF FACE IN PREVIOUS FRAME | COORDINATES OF CENTER OF FACE IN CURRENT FRAME | SIZE OF FACE IN PREVIOUS FRAME | SIZE OF FACE IN CURRENT FRAME |
|---|---|---|---|---|---|
| fp1 | fi1 | (pf1X, pf1Y) | (if1X, if1Y) | S_fp1 | S_fi1 |
| fp2 | fi2 | (pf2X, pf2Y) | (if2X, if2Y) | S_fp2 | S_fi2 |
| fp3 | fi3 | (pf3X, pf3Y) | (if3X, if3Y) | S_fp3 | S_fi3 |
| fp4 | fi4 | (pf4X, pf4Y) | (if4X, if4Y) | S_fp4 | S_fi4 |
| fp5 | fi5 | (pf5X, pf5Y) | (if5X, if5Y) | S_fp5 | S_fi5 |
| fp6 | fi6 | (pf6X, pf6Y) | (if6X, if6Y) | S_fp6 | S_fi6 |
| fp7 | fi6 | (pf7X, pf7Y) | (if6X, if6Y) | S_fp7 | S_fi6 |
| fp8 | NONE | (pf8X, pf8Y) | — | S_fp8 | — |

FIG. 11
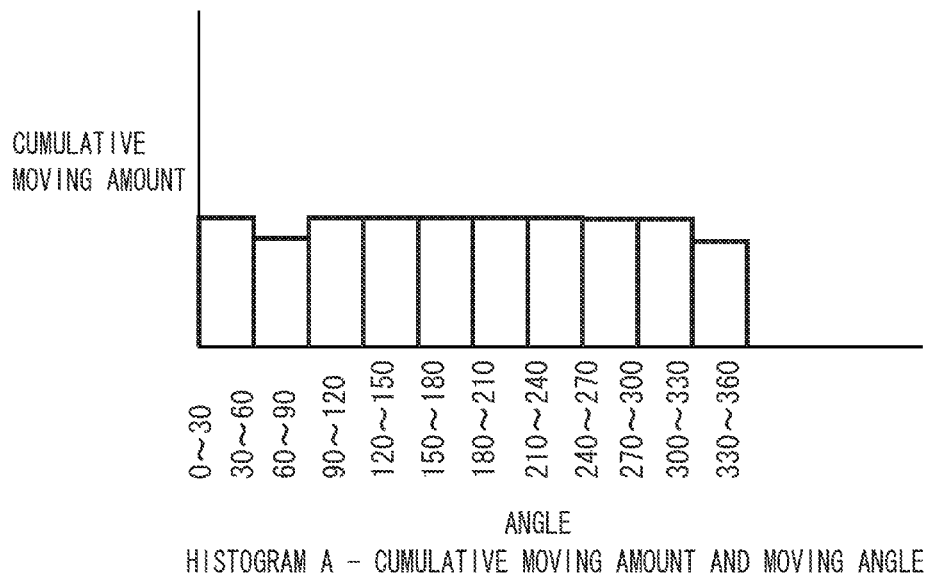
HISTOGRAM A - CUMULATIVE MOVING AMOUNT AND MOVING ANGLE
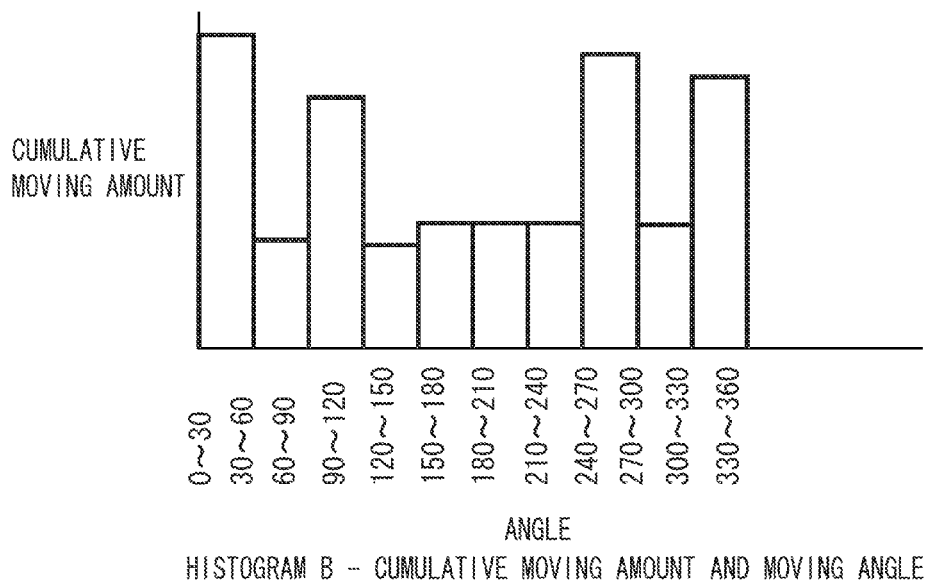
HISTOGRAM B - CUMULATIVE MOVING AMOUNT AND MOVING ANGLE

| FACE ID OF FACE IN PREVIOUS FRAME | SIZE OF FACE (PIXELS) | MOVING AMOUNT (PIXELS) |
|---|---|---|
| fp1 | 50 | 2 |
| fp2 | 53 | 3 |
| fp3 | 35 | 4 |
| fp4 | 42 | 4 |
| fp5 | 38 | 5 |
| fp6 | 22 | 7 |

CORRESPONDENCE GRAPH – FACE SIZE AND MOVING AMOUNT

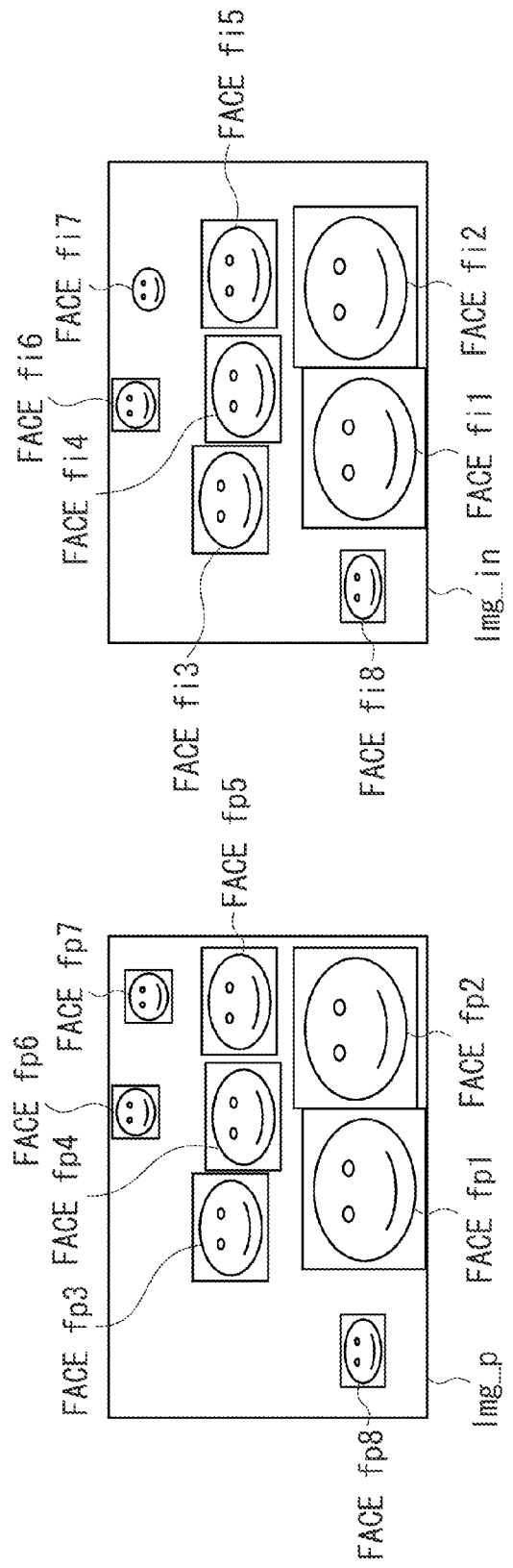

FIG. 18

| FACE ID OF FACE IN PREVIOUS FRAME | FACE ID OF FACE IN CURRENT FRAME | COORDINATES OF CENTER OF FACE IN PREVIOUS FRAME | COORDINATES OF CENTER OF FACE IN CURRENT FRAME | SIZE OF FACE IN PREVIOUS FRAME | SIZE OF FACE IN CURRENT FRAME |
|---|---|---|---|---|---|
| fp1 | fi1 | (pf1X, pf1Y) | (if1X, if1Y) | S_fp1 | S_fi1 |
| fp2 | fi2 | (pf2X, pf2Y) | (if2X, if2Y) | S_fp2 | S_fi2 |
| fp3 | fi3 | (pf3X, pf3Y) | (if3X, if3Y) | S_fp3 | S_fi3 |
| fp4 | fi4 | (pf4X, pf4Y) | (if4X, if4Y) | S_fp4 | S_fi4 |
| fp5 | fi5 | (pf5X, pf5Y) | (if5X, if5Y) | S_fp5 | S_fi5 |
| fp6 | fi6 | (pf6X, pf6Y) | (if6X, if6Y) | S_fp6 | S_fi6 |
| fp7 | UNDETECTED FACE | (pf7X, pf7Y) | — | S_fp7 | — |
| fp8 | fi8 | (pf8X, pf8Y) | (if8X, if8Y) | S_fp8 | S_fi8 |

FIG. 20

| FACE ID OF FACE IN PREVIOUS FRAME | FACE ID OF FACE IN CURRENT FRAME | COORDINATES OF CENTER OF FACE IN PREVIOUS FRAME |
|---|---|---|
| fp1 | fi1 | (300, 350) |
| fp2 | fi2 | (510, 330) |
| fp3 | fi3 | (250, 160) |
| fp4 | fi4 | (400, 180) |
| fp5 | fi5 | (560, 170) |
| fp6 | fi6 | (400, 40) |
| fp7 | UNDETECTED FACE | (560, 50) |
| fp8 | fi8 | (100, 340) |

FIG. 21

| GROUP ID | range | FACE ID |
|---|---|---|
| 1 | 40~143 | fp6 |
| 2 | 144~246 | fp3, fp4, fp5 |
| 3 | 247~350 | fp1, fp2, fp8 |

IMAGE PROCESSING APPARATUS CONFIGURED TO DETECT OBJECT INCLUDED IN IMAGE AND METHOD THEREFOR

BACKGROUND OF THE INVENTION

1. Field of the Invention

The present invention relates to an image processing apparatus configured to detect an object included in an image, such as a face, and a method therefor.

2. Description of the Related Art

A conventional method for detecting a face region from an image captured by an imaging apparatus, such as a digital camera, has been commercially used. An imaging apparatus which includes a mechanism for detecting a face region, in order to capture a highly visible image around the detected face region, has a function for increasing the brightness of the face region with priority or a function for focusing on the face region.

When a user utilizes the function like this, the user can observe and verify whether a face has been detected via a monitor of the imaging apparatus. In general, by displaying a rectangular frame surrounding a detected face region, the imaging apparatus can allow the user to verify whether a face has been detected.

An already commercialized face detection method can detect the variation of the orientation of a face if the orientation of the face has only slightly varied from the front to any other orientations. However, if the orientation of the face has varied from the front to the right abeam orientation or if the orientation of the face has greatly vary in the horizontal direction, the face that has moved in this manner may not be appropriately detected.

Furthermore, in an already commercialized face detection method, if a face region portion of an image has got defocused due to a camera shake, the face corresponding to the face region cannot be appropriately detected. Therefore, if results of face detection on images captured in a continuous time period are presented (displayed) to the user without going through any image processing or the like, if the orientation of the face included in the images has continued to vary while being displayed, the face detection may be interrupted. In this case, a face detection frame may be displayed in a blinking state. Accordingly, the results of the face detection may not be appropriately displayed.

In order to address the above-described problem, even if face detection from a specific image has failed, a face detection frame can be displayed without discontinuation by estimating the position of a face by utilizing results of past face detection. A method discussed in Japanese Patent Application Laid-Open No. 2009-17194 stores a face region of an image used for face detection in past operations and a characteristic of the image around the face region. Furthermore, the conventional method searches the stored image characteristic for a similar region. If any similar region is extracted, the conventional method estimates the extracted region as the region corresponding to the position of a face.

However, in the method discussed in Japanese Patent Application Laid-Open No. 2009-17194, if a movable camera video image, for which the position and the orientation can be changed, is subjected to face detection, the moving direction or the moving amount of a face on the movable camera video image cannot be known. Accordingly, it becomes necessary to set a wide range for searching for a face and an image characteristic of the peripheral region. Accordingly, if a plurality of faces is to be subjected to face detection, the position of each face cannot be appropriately estimated.

In order to address the above-described problem, a method discussed in Japanese Patent Application Laid-Open No. 09-212648 calculates the direction and the amount of movement of a camera. In addition, the conventional method estimates the direction and the amount of movement of a face on the image according to the calculated information about a motion of the camera to accurately estimate the position of a face. In the following description, the direction and the amount of movement of a camera are correctly referred to as "camera motion information".

In a conventional and general method for calculating camera motion information, such as the method discussed in Japanese Patent Application Laid-Open No. 09-212648, an image is divided into a plurality of block regions and to which position in a current image each block of a past image has moved is determined. Accordingly, the processing amount becomes large and the processing time becomes long.

In addition, in the above-described conventional method, if an image includes objects of different characteristics, information about the movement of each block can be appropriately calculated. However, in this conventional method, if objects constituting an image have similar characteristics, information about the movement of each block cannot be appropriately calculated. For example, if an image of a plurality of photographed faces is to be subjected to face detection, the movement information about each block cannot be appropriately calculated.

The following problem may also arise in the above-described conventional method. For example, if an image of a plurality of faces having different distances from a camera is to be taken, when the camera is moved during the imaging operation, the amount of movement of a face in the front portion (short-distance object portion) of the image (hereinafter simply referred to as a "front-portion face") and the amount of movement of a face in the back portion (long-distance object portion) of the image (hereinafter simply referred to as a "back-portion face") may differ from each other. In other words, the amount of movement is larger for a back-portion face than for a front-portion face.

Accordingly, even if camera motion information can be calculated, the above-described conventional method cannot appropriately determine the amount of movements of both a front-portion face and a back-portion face.

SUMMARY OF THE INVENTION

The present invention is directed to an image processing apparatus capable of, even if the amounts of movement of a plurality of object regions of an image greatly differ from one another, estimating the position to which an object region that is a target of detection has moved.

According to an aspect of the present invention, an image processing apparatus includes an image acquisition unit configured to acquire a plurality of input images which are serially photographed, a detection unit configured to detect a plurality of object regions from each input image acquired by the image acquisition unit, an association unit configured to associate a plurality of object regions detected from a past input image with a plurality of object regions detected from a current input image, a calculation unit configured to, if any object region that has not been appropriately associated by the association unit exists in the plurality of object regions detected from the past input image, calculate object region movement information for each size of the object region based on the plurality of object regions mutually associated between the past input image and the current input image, and an estimation unit configured to estimate a position of the object region of the current input image that has not been associated based on the movement information for each size of the object region and a size of the object region that has not been associated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 illustrates an exemplary association of faces between a face included in a previous frame and a face included in a current frame.

FIG. 6 illustrates an example of a result of provisional association.

FIG. 11 illustrates an example of a histogram of cumulative moving amount and moving angle.

FIG. 17 illustrates an example of an image of a previous frame and an image of a current frame.

FIG. 18 illustrates an example of face provisional association between a previous frame and a current frame.

FIG. 20 illustrates exemplary center coordinates of each face in a previous frame.

FIG. 21 illustrates an example of a group of faces grouped at a position in the horizontal direction.

DESCRIPTION OF THE EMBODIMENTS

Various exemplary embodiments, features, and aspects of the invention will be described in detail below with reference to the drawings.

Figure 1:
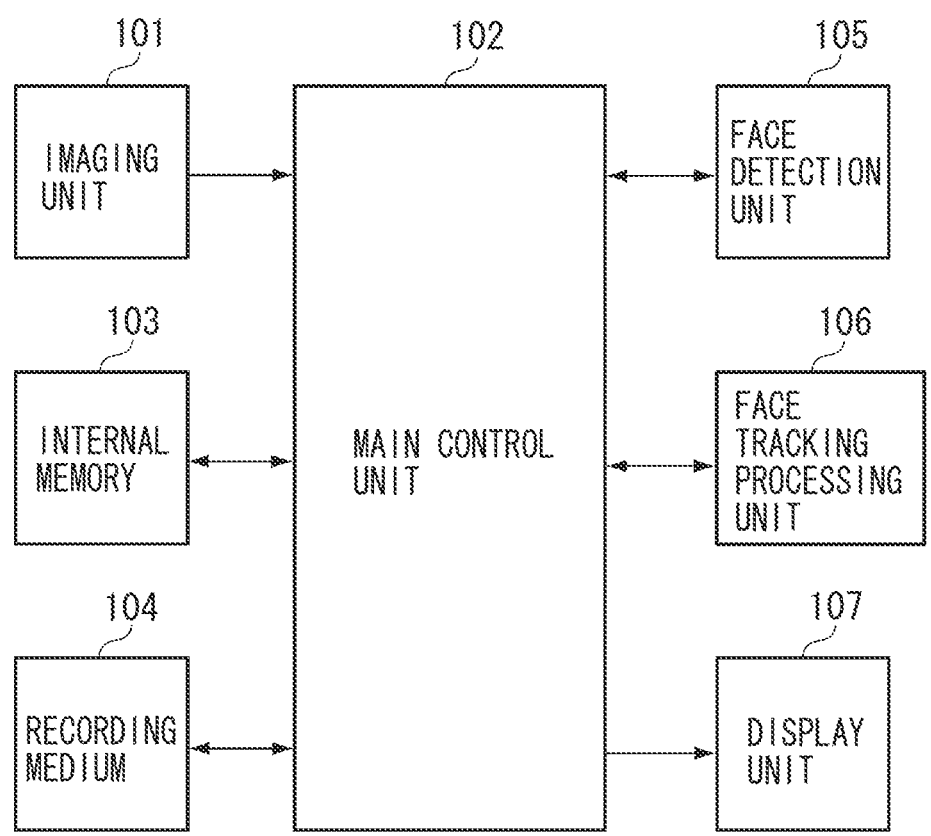
FIG. 1 is a block diagram illustrating an exemplary configuration of a digital camera according to a first exemplary embodiment of the present invention.

FIG. 1 is a block diagram illustrating an exemplary configuration of an imaging apparatus, such as a digital camera, according to a first exemplary embodiment of the present invention.

Referring to FIG. 1, an imaging unit 101 includes a control unit, which controls an image sensor, such as a charge-coupled device (CCD) sensor or a complementary metal oxide semiconductor (CMOS) sensor, an optical system, and an aperture stop. A main control unit 102 includes a central processing unit (CPU), a read-only memory (ROM), and a random access memory (RAM).

The main control unit 102 has various functions. More specifically, the main control unit 102 converts an image signal acquired by the imaging unit 101 into a digital signal. In addition, the main control unit 102 controls various image processing. Furthermore, the main•control unit 102 controls an image display by a display unit 107 and a user interface (UI) of the display unit 107. Moreover, the main control unit 102 acquires a plurality of input images, which is arranged in time series, from the imaging unit 101.

An internal memory 103 is a synchronous dynamic random access memory (SDRAM), which temporarily stores various types of data generated by the main control unit 102. A storage medium 104 is a non-volatile memory, such as a secure digital (SD) memory card.

A face detection unit 105 detects a face region from an image acquired by the imaging unit 101. A face tracking processing unit 106 estimates a current position of a face according to information about past face detection, such as a result of past face detection. The display unit 107 is constituted by a liquid crystal display (LCD). The display unit 107 displays an image acquired by the imaging unit 101 and a result of detection by the face detection unit 105.

The face detection unit 105 and the face tracking processing unit 106 can be implemented by hardware. Alternatively, the face detection unit 105 and the face tracking processing unit 106 can be implemented by software, which is implemented by the main control unit 102 by executing a software program thereof. If the face detection unit 105 and the face tracking processing unit 106 are implemented by software, the above-described program is stored on the internal memory 103. In addition, as will be described below, the imaging apparatus can include an operation unit. The imaging apparatus is an example of an image processing apparatus (computer).

Now, an exemplary flow of processing according to a first exemplary embodiment of the present invention will be described in detail below with reference to FIG. 2.

Figure 2:
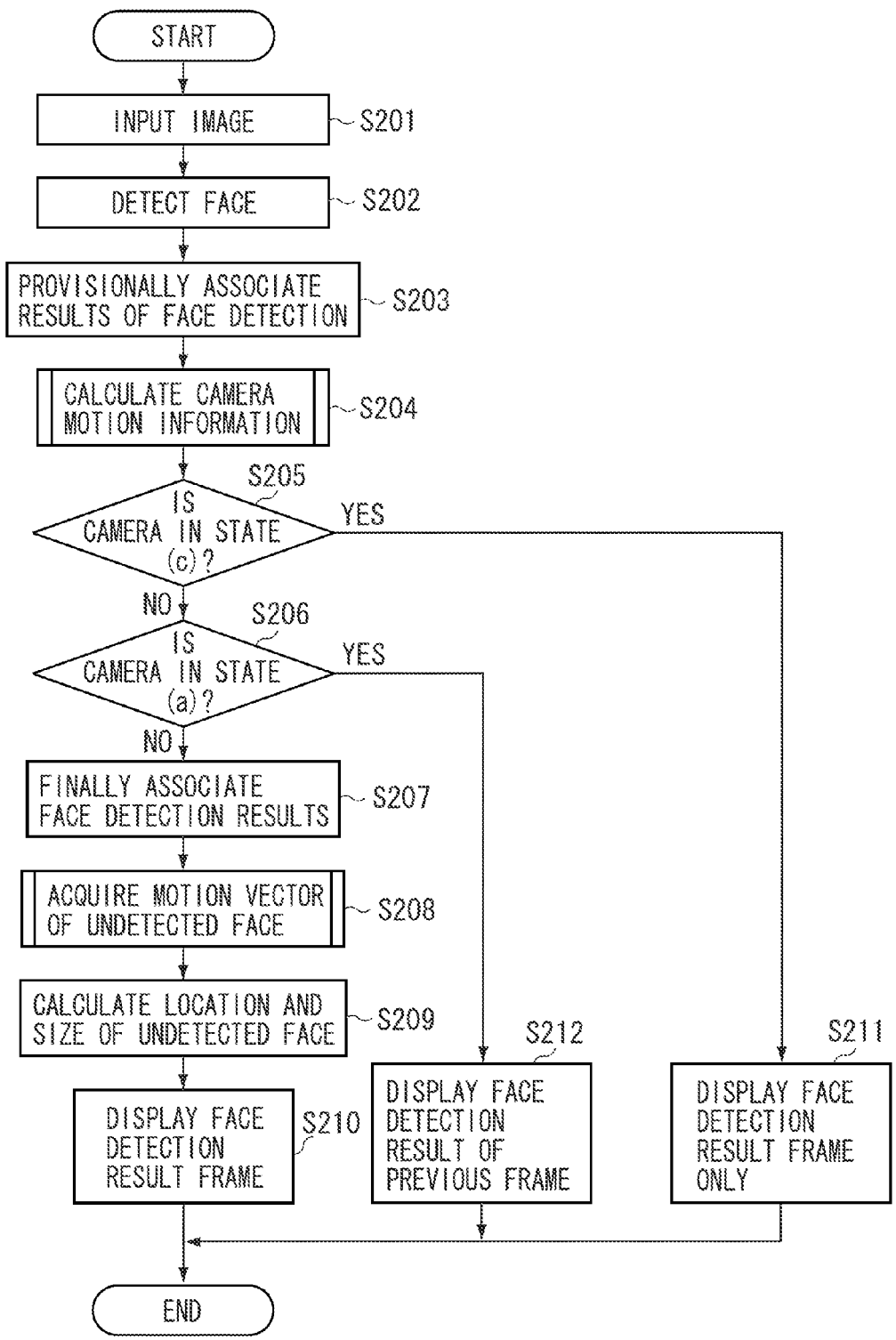
FIG. 2 is a flow chart illustrating an exemplary flow of processing according to the first exemplary embodiment.

Referring to FIG. 2, in step S201, the main control unit 102 acquires an input image Img_in from the imaging unit 101. In step S202, the face detection unit 105 executes face detection on the input image Img_in.

The face detection can be executed by a publicly known method. More specifically, the face detection can be executed by template matching of faces. In addition, the face detection can be executed by using a character extraction filter, which previously stores information acquired by machine learning, as a detection device. In the present exemplary embodiment, the face detection is not limited to a specific method. In other words, any of the above-described publicly known methods can be used for face detection.

Figure 3:
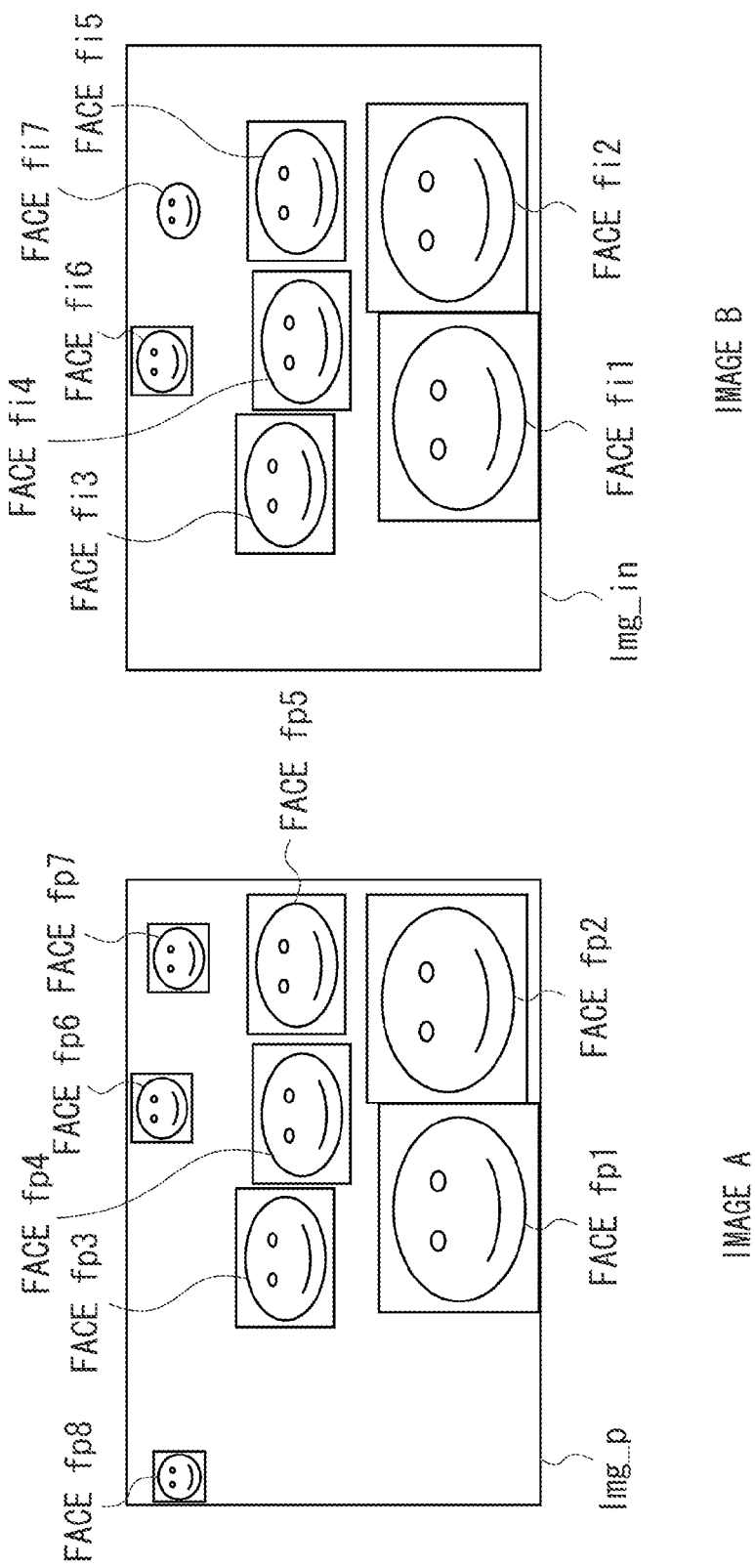
FIG. 3 illustrates a face identification (ID) of each of a previous frame and a current frame.

FIG. 3 illustrates an example of a result of face detection executed by the face detection unit 105 on an input image. Referring to FIG. 3, in an image B, face regions, from each of which a face has been appropriately extracted as a result of the face detection, are displayed with a surrounding rectangular frame, respectively. In other words, in the example illustrated in FIG. 3 as the image. B, face detection from faces fi1 through fi6 has been successfully executed but face detection from a face fi7 has failed. The following description will be made based on the above-described detection result.

In step S203, the face tracking processing unit 106 associates the result of the face detection from the current frame, which has been acquired in step S202, with a result of the face detection from a previous frame. More specifically, the face tracking processing unit 106 associates the face detection results by a simple provisional method used merely for calculating camera motion information in step S204. The simple provisional association of the face detection results will be hereafter referred to as "provisional association", which is different from "final association" in step S207.

In the following description, a previous frame will be referred to as a "previous frame Img_p" and an input image, which is the current frame, will be referred to as a "current frame Img_in".

In the example illustrated in FIG. 3, an image A includes a result of face detection from a previous frame Img_p. In the present exemplary embodiment, it is supposed that all of the faces fp1 through fp8 have been successfully detected from the previous frame Img_p.

Furthermore, in the example illustrated in FIG. 3, the current frame Img_in denotes a state in which the camera has been moved rightwards from the previous frame Img_p. In other words, in the current frame Img_in, each face has moved leftwards on the image.

Figure 4:
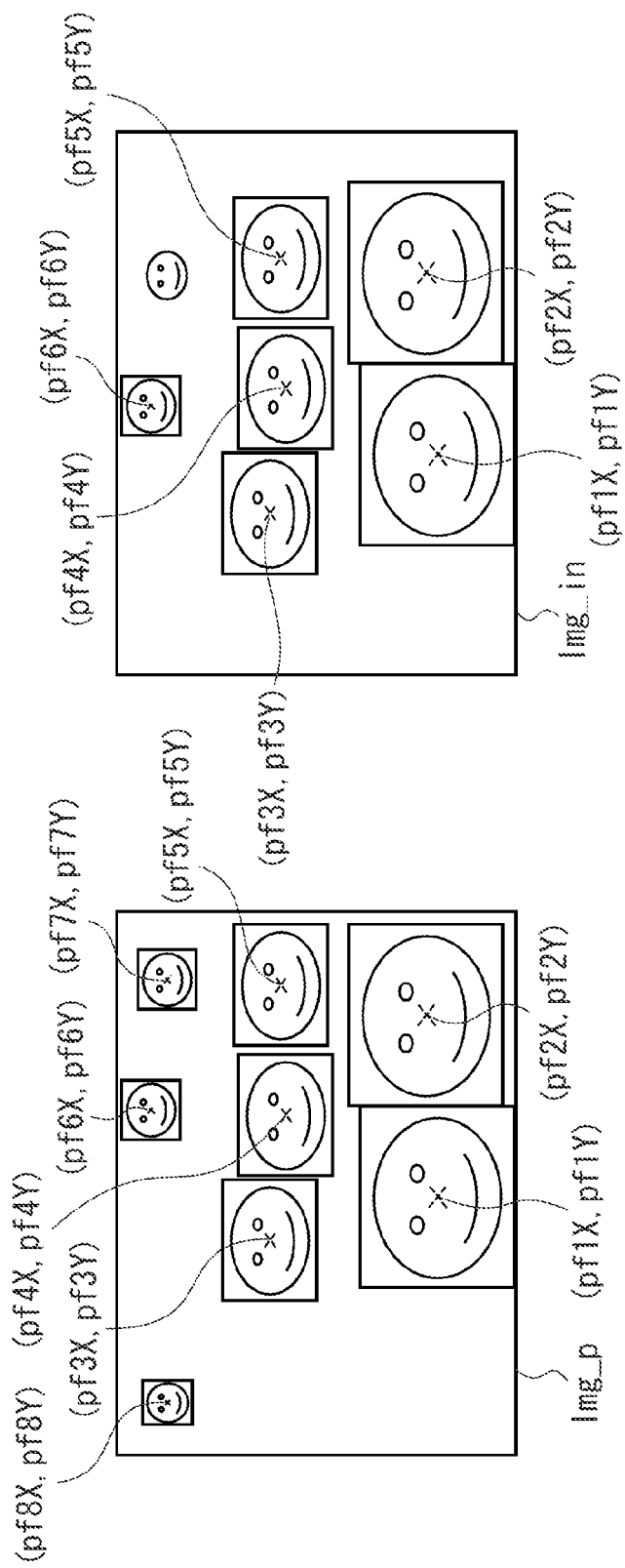
FIG. 4 illustrates center coordinates of a face, which is extracted as a result of face detection, of a previous frame and a current frame.

The face tracking processing unit 106 executes the provisional association of faces in the current frame Img_in and the previous frame Img_p by using center coordinates of each face acquired from the face detection result. FIG. 4 illustrates exemplary center coordinates of each face.

The face tracking processing unit 106 executes the provisional association by determining a face included in the current frame Img_in which has center coordinates closest to the center coordinates of the previous frame Img_p. For example, the face tracking processing unit 106 determines to which face included in the current frame Img_in the face fp1 in the previous frame Img_p corresponds by using the following expression (1):

$$L = \min_{\{1<n<=Nif\}} \sqrt{(pf1X - ifnX)^2 + (pf1Y - ifnY)^2} \quad (1)$$

where "pf1X" and "pf1Y" denote center coordinates of the face fp1 in the previous frame Img_p, respectively, "ifnX" and "ifnY" denote center coordinates of a face fin in the current frame Img_in, "Nif" denotes the total number of faces extracted from the current frame Img_in, and "L" denotes a distance between a face, among faces detected in the current frame Img_in, which has the shortest distance from the face fp1 in the previous frame Img_p. The face tracking processing unit 106 determines a face that satisfies the condition for the distance L by the expression (1) as corresponding to the face fp1.

FIG. 5 illustrates a result of the provisional association by the face tracking processing unit 106 on all the faces included in the previous frame Img_p.

Subsequently, the face tracking processing unit 106 deletes a result, if any, explicitly inappropriate as a result to be associated as corresponding, based on a ratio of variation of the size of the face over frames. The face tracking processing unit 106 executes the above-described determination by using the following expression (2):

$$thS\_min < \frac{S\_fin}{S\_fpn} < thS\_max \quad (2)$$

where "S_fpn" denotes the size of the face in the previous frame Img_p that has been determined, by the operation using the expression (1) as corresponding, "S_fin" denotes the size of a face in the current frame Img_in, "thS_min", and "thS_max" denote a maximum and a minimum values of a threshold value of the face size variation ratio of across the frames.

If the face size variation result over the frames satisfies the condition by the expression (2), the face tracking processing unit 106 determines that the faces has a correspondence relation because the face size has not greatly varied. If the condition by the expression (2) is not satisfied, the face tracking processing unit 106 determines that the faces do not have a correspondence relation.

In the present exemplary embodiment, after executing the operation by using the expression (1), the face fp8 is determined to have a correspondence relation, but after executing the operation by using the expression (2), the face tracking processing unit 106 determines that no correspondence relation exists. Finally, it is determined that no corresponding face exists.

FIG. 6 illustrates a result of the provisional association by the face tracking processing unit 106. The face tracking processing unit 106 adds the center coordinates of a face and the face size, which are acquired based on the face detection result, to a correspondence chart of FIG. 6 to use the coordinates and the size in subsequent steps.

In step S204, the face tracking processing unit 106 calculates camera motion information, such as panning and tilting of the camera, based on the face provisional association in step S203. If any face exists in the previous frame Img_p and the current frame Img_in that has not been associated one to one with any face in the other frame at the timing of the provisional association, the face tracking processing unit 106 determines that the non-associated face(s) as a processing non-target face.

In FIG. 6, the faces fp6 through fp8 are processing non-target faces. More specifically, both the faces fp6 and fp7 have been associated with the face fi6. Furthermore, the face fp8 has been determined not to have any corresponding face in the image B.

An exemplary flow of the processing in step S204 will be described in detail below with reference to FIG. 7.

Figure 7:
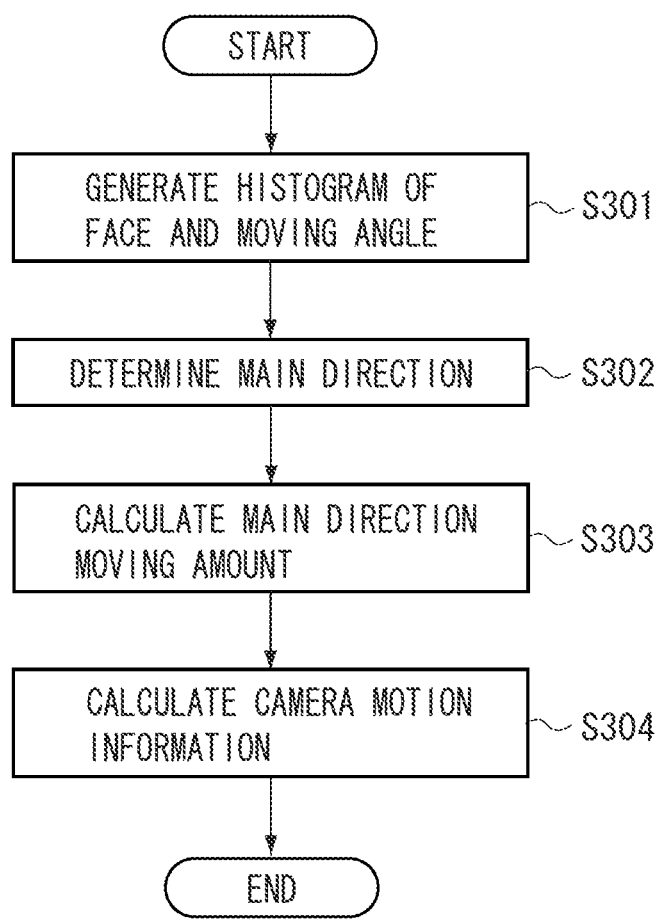
FIG. 7 is a flow chart illustrating details of exemplary processing in step S204 in FIG. 2.
Figure 8:
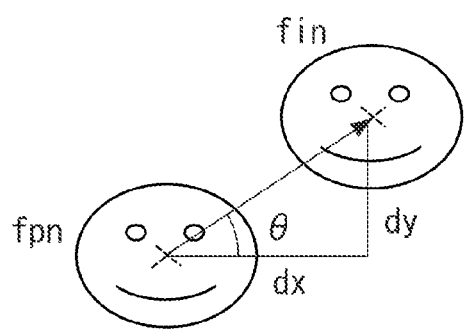
FIG. 8 illustrates an example of a state of movement when a face fpn and a face fin are mutually associated.

Referring to FIG. 7, in step S301, the face tracking processing unit 106 generates a histogram of face and moving angle based on the face moving angle and the number of faces, which have been provisionally associated with each other in step S203. FIG. 8 illustrates an exemplary state of movement if the face fpn and the face fin have been associated with each other. Referring to FIG. 8, "dx" and "dy" denote a moving amount in the X direction and a moving amount in the Y direction, respectively. "θ" denotes the moving angle.

In this case, the face tracking processing unit 106 can calculate the moving angle θ by using the following expression (3). The face tracking processing unit 106 can easily calculate the moving amounts dx and dy based on the face center coordinates of the faces in the previous frame and the current frame by referring to the correspondence chart illustrated in FIG. 6, which has been generated in step S203.

$$\theta = \frac{a\tan2(-dy, dx) \times 180.0}{3.14159265358979323846} \quad (3)$$

Figure 9:
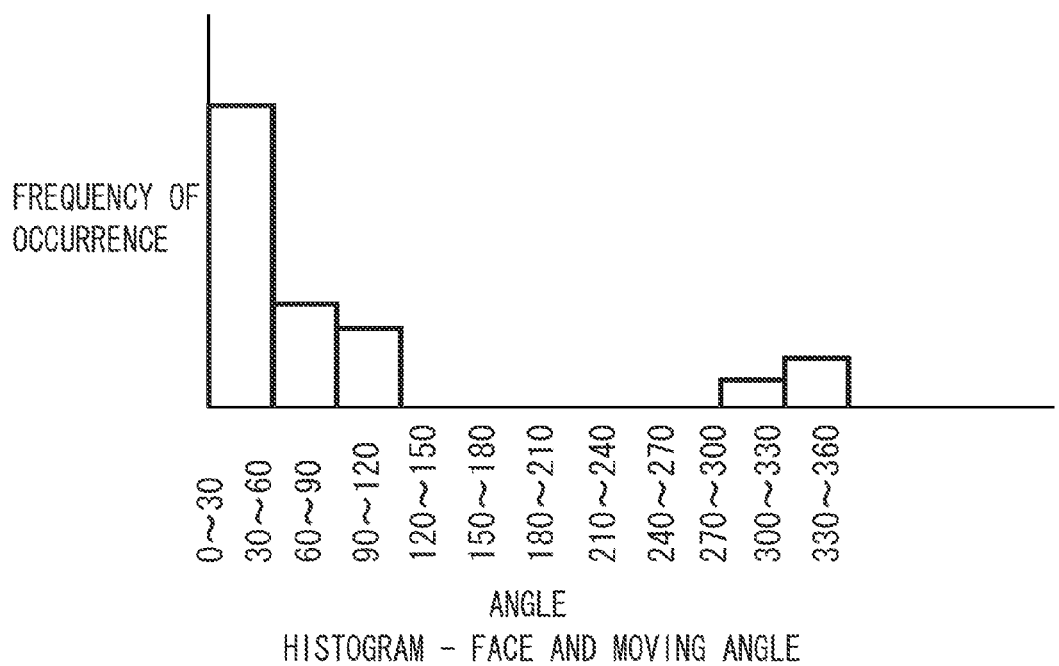
FIG. 9 illustrates an example of a histogram of face and moving angle.

FIG. 9 illustrates a histogram of face and moving angle, which is generated based on a result of counting the number of faces for each moving angle θ, which is calculated by the face tracking processing unit 106 in the above-described manner.

In the present exemplary embodiment, the moving angle ranges from 0° to 360°. The face tracking processing unit 106 counts the frequency of occurrence of the angle with twelve bins. In subsequent processing, a histogram of cumulative moving amount and moving angle becomes necessary. Accordingly, the face tracking processing unit 106 generates a histogram of cumulative moving amount and moving angle based on a result of counting a cumulative moving amount, which is an accumulation of the face moving amounts classified as having the same moving angle, for each moving angle. The face tracking processing unit 106 calculates the moving amount L of each face by using the following expression (4):

$$L = \sqrt{dx^2 + dy^2} \quad (4)$$

Figure 10:
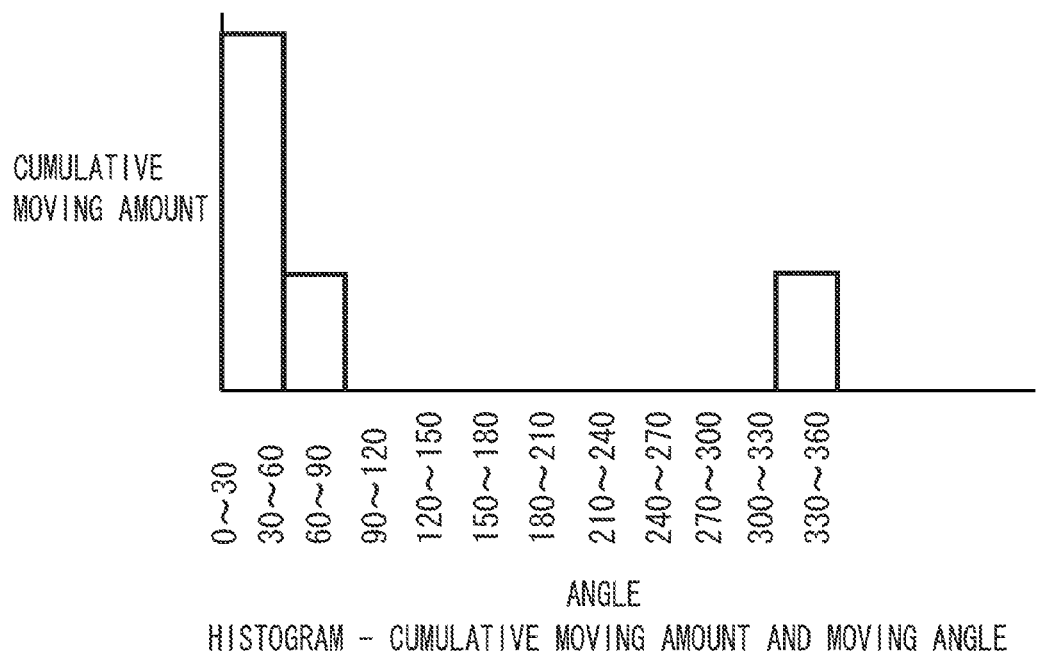
FIG. 10 illustrates an example of a histogram of cumulative moving amount and moving angle.

FIG. 10 illustrates an example of the histogram of cumulative moving amount and moving angle.

In step S302 (FIG. 7), the face tracking processing unit 106 determines a main direction by referring to the histogram of face and moving angle generated in step S301. The main direction is the highest angle among those included in the histogram of face and moving angle. More specifically, in the present exemplary embodiment, the main direction can have a range of 0° to 30°.

In step S303, the face tracking processing unit 106 calculates a moving amount in the main direction determined in step S302 (hereinafter simply referred to as a "main direction moving amount". More specifically, the face tracking processing unit 106 determines an average value of the cumulative moving amounts calculated in step S302 as the main direction moving amount. In other words, a main direction moving amount move_m can be calculated by dividing a value of the cumulative moving amounts, which are distributed in the angle of the main direction, by the number of faces distributed in the main direction.

In step S304, the face tracking processing unit 106 calculates camera motion information based on the main direction determined in step S302 and the main direction moving amount calculated in step S303. In the present exemplary embodiment, state information about the motion of the camera, which is determined by the face tracking processing unit 106, includes three states, such as "stationary state (state (a))", "panning or tilting (state (b))", and "other states (state (c))".

If the user of the camera has been executing a complicated camera operation in which panning and zooming are simultaneously executed, i.e., if the camera is in a state in which camera motion information cannot be accurately calculated, the face tracking processing unit 106 determines that the camera is in the "other states (state (c))".

If the value of the main direction moving amount move_m is smaller than a predetermined threshold value th_dir, then the face tracking processing unit 106 determines that the camera is in the "stationary state (state (a))". On the other hand, if the value of the main direction moving amount move_m is equal to or greater than the predetermined threshold value th_dir, then the face tracking processing unit 106 determines which of the states (b) and (c) the camera is in by analyzing the state of distribution in the histogram of face and moving angle.

If the distribution of the histogram of face and moving angle has a peak at a specific angle, it can be recognized that the camera has moved to the angle. Accordingly, in this case, the face tracking processing unit 106 determines that the camera is in the state (b). In the other cases, if the frequency is distributed to most of the angles as a histogram A of cumulative moving amount and moving angle (FIG. 11) or if a plurality of peaks exists at a plurality of different angles as a histogram B of cumulative moving amount and moving angle (FIG. 11), it can be recognized that a complicated camera operation has been executed. Accordingly, in this case, the face tracking processing unit 106 determines that the camera is in the state (c).

It can be determined that the histogram of face and moving angle has the above-described distribution corresponding to the camera motion state (b) by the following method. More specifically, the face tracking processing unit 106 determines the distribution of angles of the frequency equal to or higher than an average frequency. If the distribution value is lower than a predetermined threshold value, i.e., if angles having a high frequency concentratedly exist at a specific angle, the face tracking processing unit 106 can determine that the camera is in the state (b).

If the camera is in the state (b) as a result of the determination on the state of the camera by the above-described method, the face tracking processing unit 106 calculates an X-direction moving amount vec_x and a Y-direction moving amount vec_y.

The face tracking processing unit 106 can calculate the moving amounts by using the following expressions (5) based on the main direction angle θ, which has been determined in step S302, and the main direction moving amount move_m, which has been calculated in step S303:

vec_x=move_m×cos θ vec_y=move_m×sin θ  (5)

Referring back to FIG. 2, in step S205, the face tracking processing unit 106 determines whether the camera is in the state (c) based on a result of the processing in step S204. If the camera is in the state (c) (YES in step S205), it is difficult to estimate the position of a face by using the camera motion information. Accordingly, in this case, the processing advances to step S211 without estimating the face position.

In step S211, the main control unit 102 displays a result frame only for the face detected by the face detection in step S202. On the other hand, if the camera is not in the state (c) (NO in step S205), then the processing advances to step S206.

In step S206, the face tracking processing unit 106 determines whether the camera is in the state (a) based on the result of the processing in step S204. If it is determined that the camera is in the state (a) (YES in step S206), because the camera is in the stationary state (because the position of the face has not varied), the processing advances to step S212. In step S212, the face tracking processing unit 106 directly displays the detection result frame for the previous frame.

On the other hand, if it is determined that the camera is not in the state (a) (NO in step S206), the processing advances to step S207. In step S207, the face tracking processing unit 106 verifies whether any inappropriately associated faces exist in the faces provisionally associated in step S203 based on the camera motion information calculated in step S204. If it is verified that no inappropriately associated face exists, the face tracking processing unit 106 finally associates the faces.

After executing the above-described processing, the face tracking processing unit 106 can identify an undetected face, if any. In the present invention, an "undetected face" refers to a face that has been detected in the previous frame but has not been detected in the current frame.

More specifically, at first, the face tracking processing unit 106 determines whether inappropriately associated faces exist as a result of the provisional association in step S203. The inappropriate face association determination processing can be executed as follows.

The face tracking processing unit 106 calculates the moving angle and the moving amount of the faces based on the center coordinates of the face in the previous frame Img_p and those of the face in the current frame Img_in, which have been provisionally associated with each other in step S203. In addition, the face tracking processing unit 106 compares the moving angle of the face with the main direction included in the camera motion information, which has been calculated in step S204. Furthermore, the face tracking processing unit 106 compares the moving amount of the face with the main direction moving amount included in the camera motion information calculated in step S204.

If any of the difference between the moving angle and the main direction and the difference between the moving amount and the main direction moving amount has exceeded a specific range, the face tracking processing unit 106 determines that inappropriately provisionally associated faces exist.

In the present exemplary embodiment, the faces fp7 and fp6 have been provisionally associated. However, because the moving amount thereof exceeds a predetermined range, the face tracking processing unit 106 determines that the faces fp7 and fp6 have been inappropriately associated with each other.

At this timing, the face fp7 can be recognized as not having been detected in the current frame or as having gone out of the current frame. Accordingly, in this case, the face tracking processing unit 106 determines which of the above-described state (i.e., which of an undetected state or a frame-out state the face fp7 is in).

The face tracking processing unit 106 executes the determination by the following expression (6) by using the X-direction moving amount vec_x and the Y-direction moving amount vec_y, which are included in the face center coordinates and the camera motion information of the previous frame. It is supposed that for the image size, the image has 640 (width)×480 (height) pixels in the present exemplary embodiment.

$$0 <= pfnX + Vec\_x < 640$$

$$0 <= pfnY + Vec\_y < 480 \quad (6)$$

If the condition by the expression (6) is satisfied, the face fp7 must exist within the current frame. Accordingly, the face tracking processing unit 106 determines that the face fp7 is an undetected face, which has not been successfully detected in the current frame. On the other hand, if the condition by the expression (6) is not satisfied, the face fp7 must exist outside the current frame. Accordingly, the face tracking processing unit 106 determines that the face fp7 is a frame-out face.

In step S208, the face tracking processing unit 106 calculates a face motion vector. In the present exemplary embodiment, a "face motion vector" refers to a vector of the direction and the amount of movement of a face within the image if the camera has moved between the previous frame and the current frame.

If the camera has moved and the faces have moved between the previous frame Img_p and the current frame Img_in as illustrated in FIG. 3, within the image, the moving amount of the face of a person included in the front (short-distance-object) region of the image and that of the face of a person included in the back (long-distance-object) region may differ from each other. In general, if the persons taken in the image are stationary at a sufficient level, the amount of movement within the image of a person taken in the image in the back region of the image is greater compared to that of a person taken in the front region of the image.

Accordingly, if the moving amount of the faces is uniquely determined for the image, an appropriate moving amount cannot be determined for all the faces. In order to solve the above-described problem, the present exemplary embodiment determines the moving amount according to the size of a face.

Figure 12:
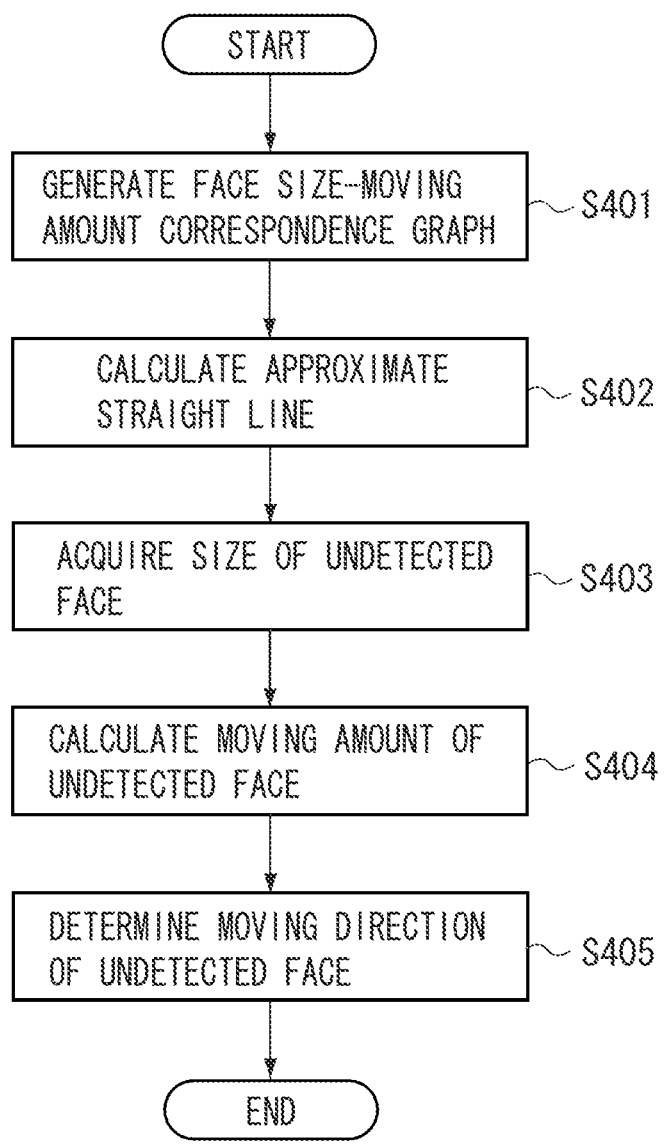
FIG. 12 is a flow chart illustrating details of exemplary processing in step S208 according to the first exemplary embodiment.

FIG. 12 is a flow chart illustrating details of exemplary processing in step S208. Referring to FIG. 12, in step S401, the face tracking processing unit 106 plots the moving amount of the face for the size of the face and generates a face size and moving amount correspondence graph based thereon.

Figures 13, 14:
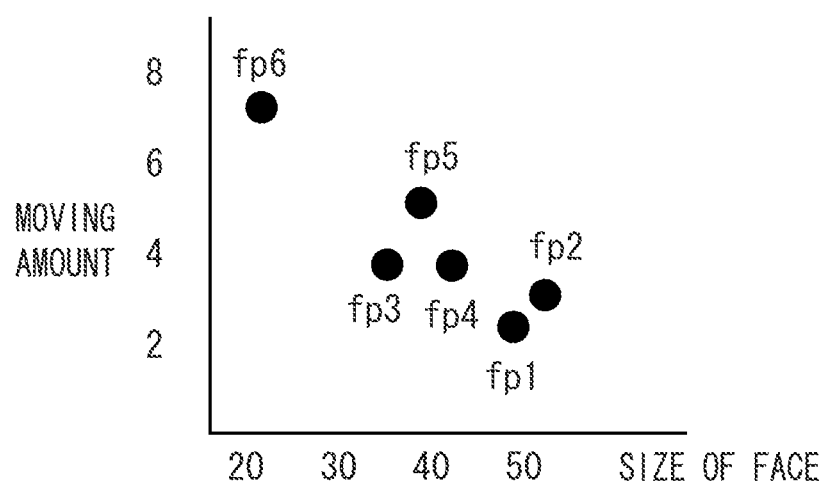
FIG. 13 illustrates a face size and a moving amount of each of faces fp1 through fp6.
FIG. 14 illustrates an example of a face size and moving amount correspondence graph.

If the faces fp1 through fp6 have the face sizes and the moving amounts illustrated in FIG. 13, a face size and moving amount correspondence graph illustrated in FIG. 14 is generated. In step S402, by linear regression on the correspondence graph generated in step S401, the face tracking processing unit 106 calculates an approximate straight line of the face size and the moving amount.

Figure 15:
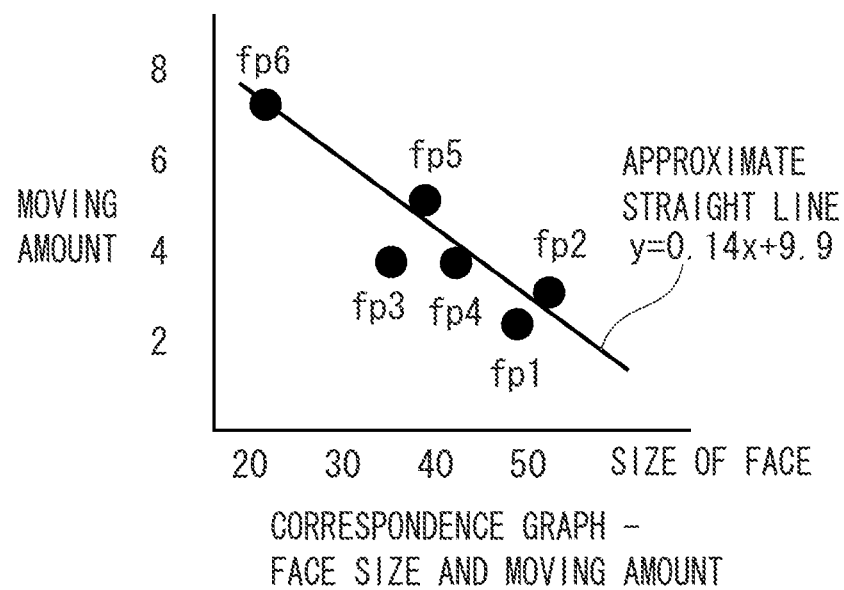
FIG. 15 illustrates an example of a face size and moving amount correspondence graph to which an approximate straight line is added.

More specifically, the approximate straight line can be calculated by the face tracking processing unit 106 by the following expression (7) by using the method of least squares, which is a typical method of linear recurrence, by using the values illustrated in the correspondence chart in FIG. 13:

$$y = -0.14x + 9.9 \quad (7)$$

where "x" is a variable that denotes the face size and "y" is a variable that denotes the moving amount. FIG. 15 illustrates an example of a face size and moving amount correspondence graph to which an approximate straight line is added.

In step S403, the face tracking processing unit 106 acquires the size of the undetected face. To acquire the size of the undetected face, the face tracking processing unit 106 refers to the size of the face in the previous frame, by referring to the correspondence chart of FIG. 6.

In step S404, the face tracking processing unit 106 substitutes the size of the undetected face acquired in step S403 into the expression (7), which is used in step S402, to calculate an undetected face moving amount L_ff. In step S405, the face tracking processing unit 106 determines an undetected face moving direction θ_ff. For the undetected face moving direction θ_ff, the angle in the main direction, which has been determined in step S302, is used.

As a result, an undetected face motion vector (vec_ff_x, vec_ff_y) is calculated by the following expressions $$vec\_ff\_x = L\_ff \times \cos\theta\_ff$$

$$vec\_ff\_y = L\_ff \times \sin\theta\_ff \quad (8)$$

Referring back to the flow chart of FIG. 2, in step S209, the face tracking processing unit 106 calculates the position and the size of the undetected face. More specifically, the face tracking processing unit 106 calculates the center coordinates of the face as coordinates for the position of the undetected face.

The face tracking processing unit 106 calculates center coordinates of the undetected face (Cx, Cy) by the following expressions (9). In this calculation, the face tracking processing unit 106 uses center coordinates of the undetected face in the previous frame (pfnX, pfnY) and the undetected face motion vector (vec_ff_x, vec_ff_y). It is supposed that a face ID of the undetected face is "fpn".

$$Cx = pfnX + vec\_ff\_x$$

$$Cy = pfnY + vec\_ff\_y \quad (9)$$

Subsequently, the face tracking processing unit 106 calculates the size of the undetected face. More specifically, the face tracking processing unit 106 calculates an undetected face size S_ff as follows. The face tracking processing unit 106 calculates an average value ave_fr of the ratio of variation of the size of the faces, which are associated between the previous frame and the current frames. Furthermore, the face tracking processing unit 106 multiplies the size of the undetected face in the previous frame by the average value ave_fr to calculate the undetected face size s_ff.

In the present exemplary embodiment, the face size of the undetected face fp7 is S_fp7 as illustrated in FIG. 6. Accordingly, the face size of the undetected face fp7 in the current frame is S_fp7×ave_fr. In calculating the average value of the variation ratio, the face tracking processing unit 106 uses the faces associated by the final association in step S207 only. In step S210, the main control unit 102 displays the final detection result on the display unit 107.

Figure 16:
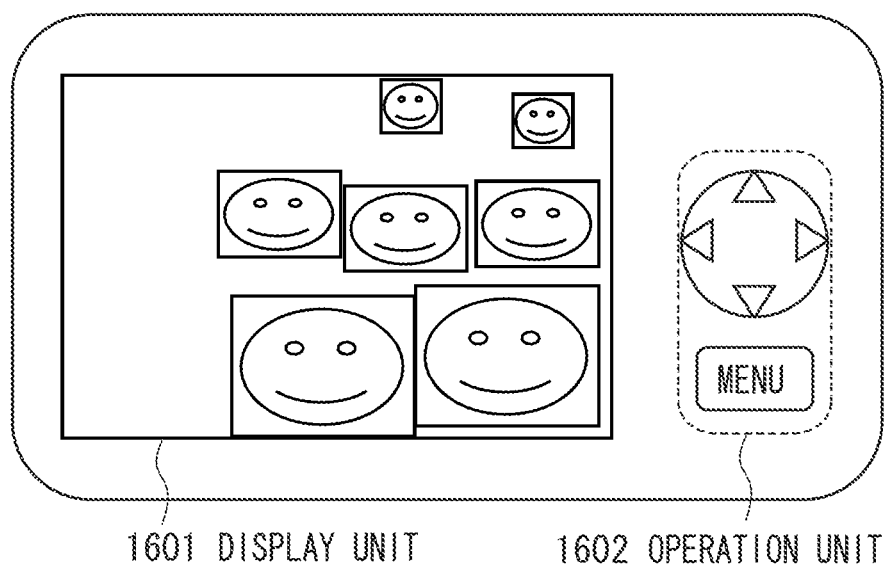
FIG. 16 illustrates an example of a detection frame displayed on a display unit of a digital camera.

FIG. 16 illustrates an example of a detection frame displayed on a display unit of a digital camera. Referring to FIG. 16, the digital camera includes a display unit (the display unit 107). In addition, the digital camera includes an operation unit 1602. The user can execute shooting, display a photographed image, and delete data via the operation unit 1602.

As described above, in the present exemplary embodiment, the face tracking processing unit 106 calculates a motion vector of faces by utilizing the position and the size of the faces detected in both the previous frame Img_p and the current frame Img_in. Furthermore, the face tracking processing unit 106 estimates the position and the size of a face whose detection in the current frame Img_in has failed.

According to the present exemplary embodiment having the above-described configuration, by calculating the motion vector according to the face size and by estimating the position of an undetected face, an appropriate moving amount can be calculated for all the faces included in the image even if the faces have different moving amounts within the image.

FIG. 17 illustrates an example of each of the previous frame Img_p and the current frame Img_in according to a second exemplary embodiment of the present invention. If a woman or a child is taken in an image, the size of the face may be small. In this case, if the person is taken in the image in the front (short-distance-object) region of the image as indicated by a face fp8 in FIG. 17, the size of the face of the woman or the child may seem to be approximately the same as the size of the face of a person taken in the back (long-distance-object) region of the image. In this case, if the face sizes are the same, the face moving amounts of the faces between frames may be different from one another.

In other words, in the present exemplary embodiment, the moving amount of the face fi6 becomes larger than the moving amount of the face fi8. If the moving amount is determined based on a result acquired when the faces are grouped in the same group, the accuracy of face detection may degrade. In the present exemplary embodiment, a method for determining the moving amount of an undetected face without degrading the accuracy will be described.

In the first exemplary embodiment, in step S303 (FIG. 7), the face tracking processing unit 106 calculates the motion vector for each face size. In the present exemplary embodiment, the face tracking processing unit 106 restricts the faces used in the calculation according to the position of the face within the image in the horizontal direction to exclude faces that may become the cause of degradation of accuracy.

More specifically, the face tracking processing unit 106, at first, divides an image in the horizontal direction. Then, by using object regions having approximately the same size, which exist in the same object region of the image, the face tracking processing unit 106 calculates object motion information for each size of the object region.

Accordingly, the present exemplary embodiment is especially highly effective in taking an image of a group of persons who are lined up in a plurality of lines in the direction horizontal to the camera is coming near the camera, with their faces facing the camera. In the present exemplary embodiment, "approximately the same size" can include a predetermined size difference range.

In the present exemplary embodiment, only a par of the processing in step S208 is different from that of the first exemplary embodiment. Accordingly, the processing in steps S201 through S207, S209, and S210 is similar to the processing in the first exemplary embodiment. Accordingly, the detailed description thereof will not be repeated here.

FIG. 18 illustrates an example of a face correspondence chart, which stores the correspondence of faces between the previous frame and the current frame. The chart illustrated in FIG. 18 is generated by processing up to step S207 according to the present exemplary embodiment.

In the present exemplary embodiment, it is supposed that the face fp7 is the undetected face and the other faces have been associated by the final association in step S207.

Figure 19:
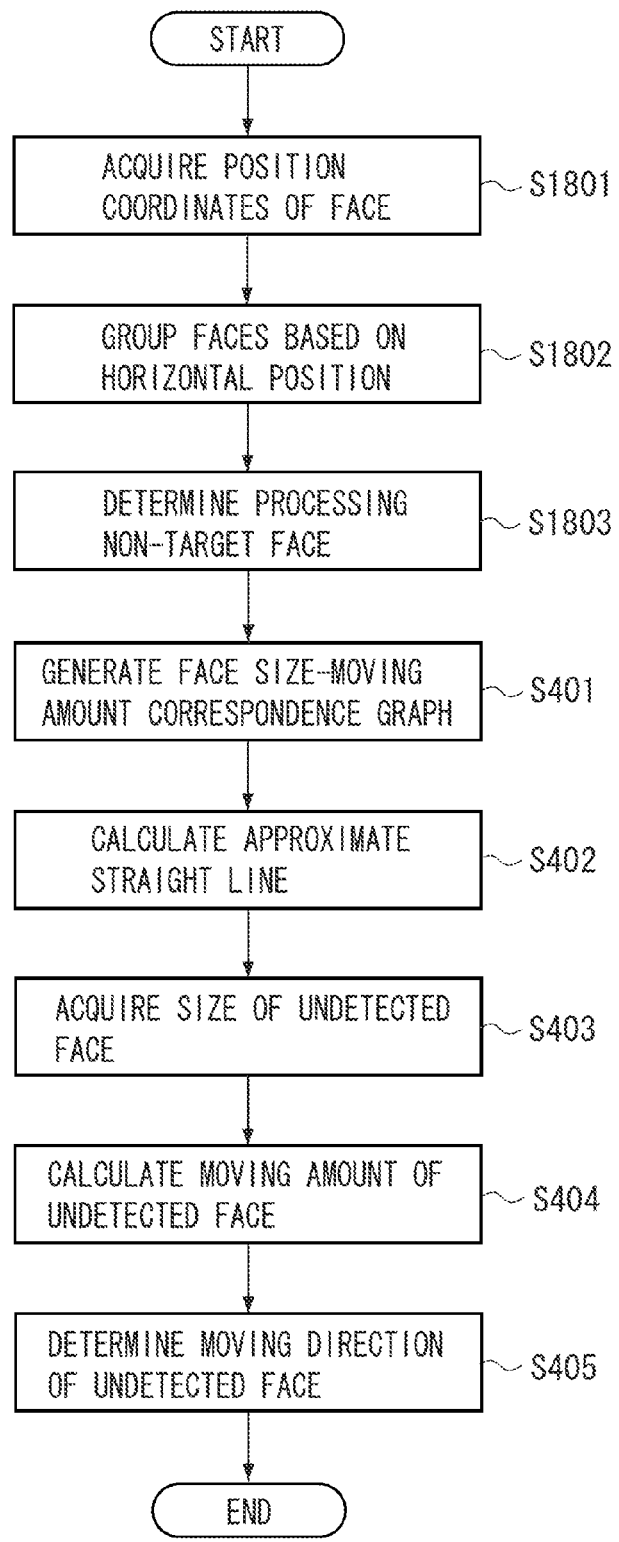
FIG. 19 is a flow chart illustrating details of exemplary processing in step S208 according to a second exemplary embodiment of the present invention.

FIG. 19 is a flow chart illustrating an exemplary flow of processing in step S208 according to the present exemplary embodiment. Referring to FIG. 19, in step S1801, the face tracking processing unit 106 acquires position coordinates of the face finally associated in step S207 by referring to the correspondence chart illustrated in FIG. 18.

In step S1802, the face tracking processing unit 106 groups the faces at the position thereof in the horizontal direction according to the position coordinates acquired in step S1801. For example, the faces can be grouped in the following manner. More specifically, the face tracking processing unit 106 can acquire a Y-coordinate maximum value f_max and a Y-coordinate minimum value f_min of the face in the previous frame Img_p. Furthermore, the face tracking processing unit 106 can group the faces in the unit of a group satisfying a condition of the face size, which is expressed by the following expression (10):

$$\text{range} = \frac{f\_max - f\_min}{M} \quad (10)$$

where "M" denotes the number of groups, which can be previously defined. In the present exemplary embodiment, it is supposed that M=3. For the face center coordinates of each face, values illustrated in FIG. 20 can be used.

Figure 22:
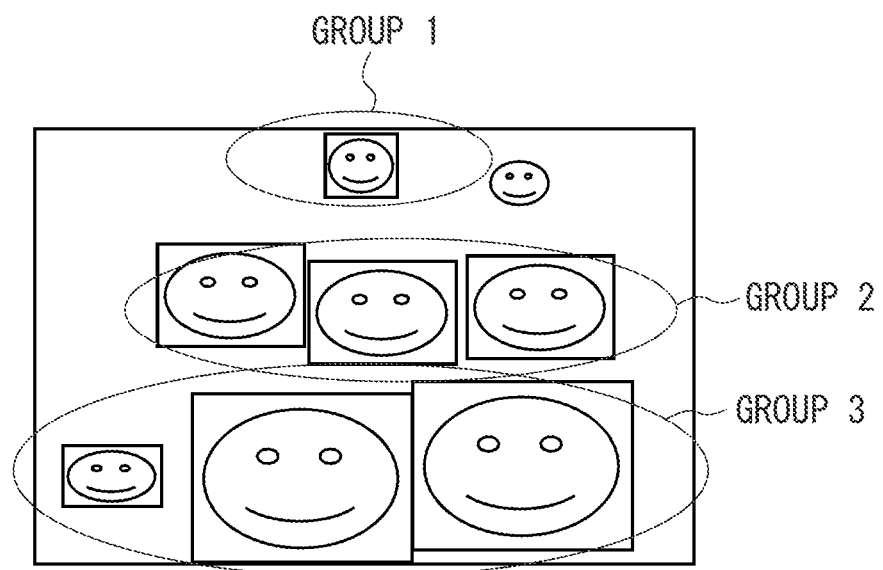
FIG. 22 illustrates an example of a grouping result displayed on an image.

FIG. 21 illustrates an example of a result of grouping of the faces, which is executed by the face tracking processing unit 106 by using the expression (10). FIG. 22 illustrates an image including the result the grouping.

In step S1803, if a group, of the groups formed in step S1802, includes any face having a size extremely different from the sizes of the other faces, the face tracking processing unit 106 excludes the face of the extremely different size from the faces to be processed in step S401.

A processing non-target face can be determined as follows. More specifically, the face tracking processing unit 106 calculates an average value of the sizes of faces in a group. In addition, the face tracking processing unit 106 determines whether a face of a size extremely different from the average value exists in the group. If any face of a size extremely different from the average value exists in the group, the face tracking processing unit 106 determines the face as a processing non-target face. More specifically, in the present exemplary embodiment, a face fi8 of a group 3 is determined as a processing non-target face.

In the processing in step S401, the face tracking processing unit 106 uses the faces other than the face that has been determined in step S1803 as a processing non-target face in executing the same processing as that in the first exemplary embodiment. Processing in steps S401 through S405 in FIG. 19 is similar to that in the first exemplary embodiment. The processing similar to that in the first exemplary embodiment is provided with the same step number and the detailed description thereof will not be repeated here.

As described above, in the present exemplary embodiment, in calculating the face moving amount, a face of a size explicitly different from the sizes of the other faces at the position in the horizontal direction is excluded from the target of the calculation. Accordingly, the present exemplary embodiment can calculate the face moving amount based on the faces from which the face of a size explicitly different from the sizes of the other faces is excluded even if the face of the explicitly different size exists at a position distant from the camera by the same distance as the distance of the other faces from the camera.

Accordingly, the present exemplary embodiment can estimate the position of an undetected face with a high accuracy even if an image including the face of a woman or a child, whose size may be smaller than an average size of the face of an adult, is used.

In the first and the second exemplary embodiments described above, the face tracking processing unit 106 estimates the position of an undetected face not detected in the current frame Img_in. However, in a specific state, the position of an undetected face not detected in the current frame Img_in may not be appropriately estimated.

More specifically, if a person taken in the image suddenly starts running, the moving amount of the face between the previous frame Img_p and the current frame Img_in may become extremely great. In this case, the face may not exist at the estimated position. On the other hand, if the person taken in the image stays stationary but if the camera moves in a reverse direction (a direction reversely different from the position of the person's face) by panning or tilting, the face actually exists in the reverse direction of the direction of the estimated position. In this case, similar to the above-described case, the face may not exist at the estimated position.

If the estimated position is presented to the user as it is in this state, the detection result frame may be displayed at a position at which no face exists. In this case, an inappropriate display may be executed. In particular, in the latter state, inappropriate detection results may be displayed for a large number of faces in the image.

In order to prevent this, in a third exemplary embodiment of the present invention, the main control unit 102 acquires skin-color information, which is information about a skin color existing around the position of the undetected face estimated by the first exemplary embodiment or the second exemplary embodiment, as an example of a representative color.

Furthermore, the main control unit 102 determines whether a face region actually exists at the estimated position based on the skin-color information. The result of the detection is displayed only if it is determined that a face region actually exists at the estimated position.

Figure 23:
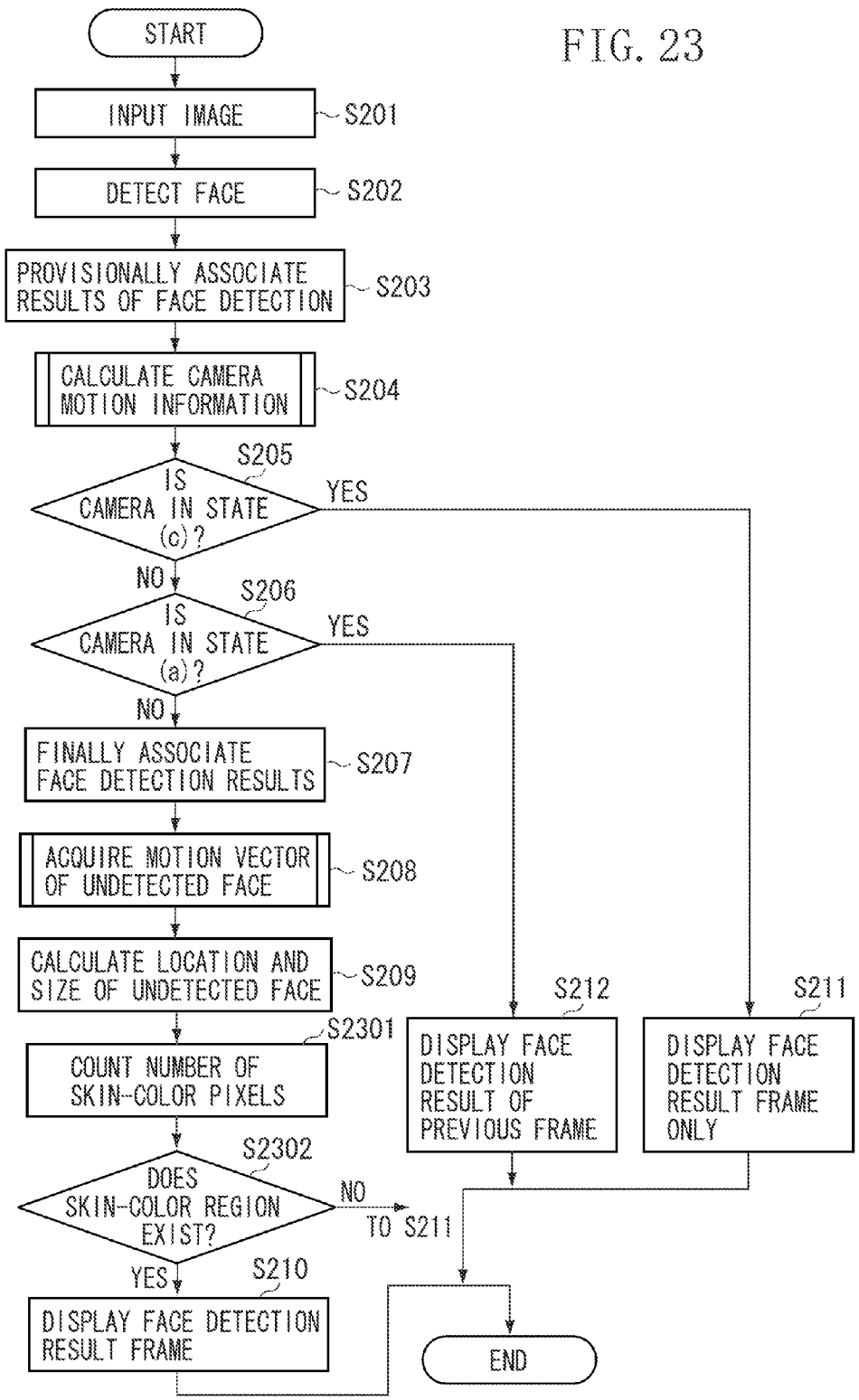
FIG. 23 is a flow chart illustrating an exemplary flow of processing according to a third exemplary embodiment of the present invention.

FIG. 23 is a flowchart illustrating an exemplary flow of processing according to the present exemplary embodiment. Processing in steps S201 through S209 is similar to the processing in the first exemplary embodiment. Accordingly, the detailed description thereof will not be repeated here.

Referring to FIG. 23, in step S2301, the main control unit 102 counts the number of skin-color pixels existing around the estimated position of the undetected face, which has been calculated in step S209.

A rectangular region, which is generated based on center coordinates and the size of the undetected face calculated in step S209, may often be set to have a size by which a side of the rectangular region may become adjacent to a side of the face region when the face is oriented to the front. Accordingly, if the face is oriented in an oblique orientation from the front, a background region or a region including the hair of the person may be included in an edge of the rectangular region. In this case, it becomes impossible to extract a skin-color region only.

In order to prevent this, the main control unit 102 sets a region, in which the size of the undetected face calculated in step S209 is reduced, as a skin-color search region used for counting the number of skin-color pixels.

Figure 24:
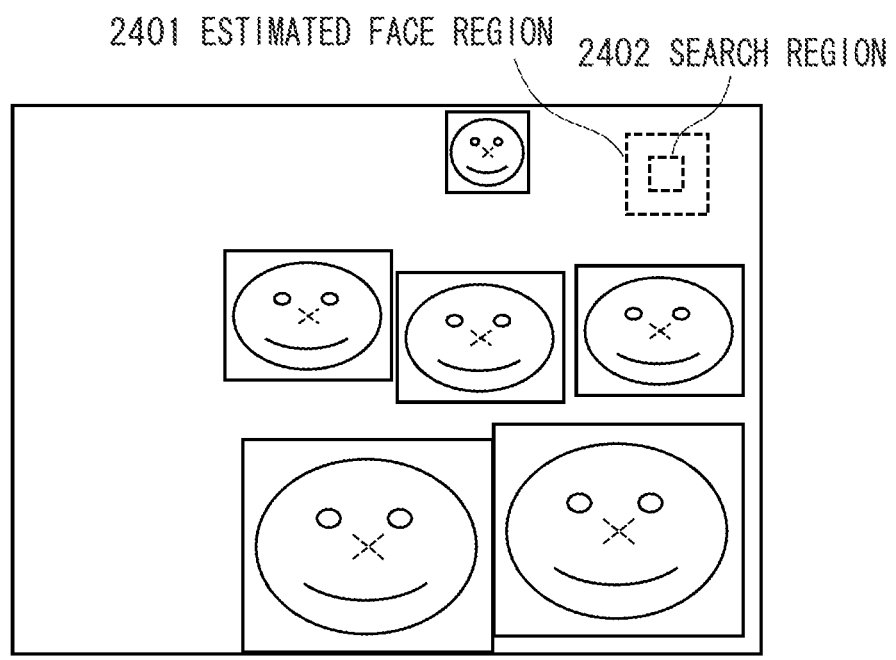
FIG. 24 illustrates an example of a relationship between a rectangular region and a skin-color search region.

FIG. 24 illustrates a relationship between a rectangular region, which is set based on the center coordinates and the size of the undetected face calculated in step S209, and a skin-color search region, which is to be actually set.

Referring to FIG. 24, a rectangular region (estimated face region) 2401 is set based on the center coordinates and the size of the undetected face calculated in step S209. A region 2402 is set as a skin-color search region (hereinafter simply referred to as a "search region"). More specifically, a region within a predetermined range from the center of the estimated face region is set as the search region.

The method for detecting the skin-color pixel is not limited to a specific method. In other words, the skin-color pixel can be detected by using a publicly known method. For example, the method discussed in Japanese Patent Application Laid-Open No. 09-107551 can be used. In the method discussed in Japanese Patent Application Laid-Open No. 09-107551, a value of a skin-color pixel, which is previously measured, is plotted in a common color space, such as the red (R), green (G), and blue (B) (RGB) color space or the YcbCr color space. In this case, the range of skin-color pixels can be determined in the color space.

In order to detect a skin-color pixel with a higher accuracy, the main control unit 102 can store the range of a skin-color region in the previous frame and determine the range of the skin-color region in the current frame based on the stored range.

In step S2302, the main control unit 102 determines whether the ratio of skin-color pixels existing within the skin-color search region to all the pixels within the skin-color search region is equal to or higher than a predetermined ratio. The main control unit 102 determines whether a face region exists in the skin-color search region according to a result of the determination of the ratio.

The determination as to whether a face region exists in the skin-color search region can be executed by using the following expression (11):

$$Hi > Pi \times thP \quad (11)$$

where "Hi" denotes the number of skin-color pixels counted in step S2301, "Pi" denotes the total number of pixels included in the skin-color search region, and "thP" denotes the predetermined ratio.

If it is determined that the condition by the expression (11) is satisfied (YES in step S2302), then the main control unit 102 determines that a face region exists at the estimated position. Then, the processing advances to step S210. In step S210, the main control unit 102 executes control for displaying the position of the face detected in step S202 and the position of the undetected face estimated by the processing in steps S203 through S209 as a frame of a final detection result.

On the other hand, if the condition by the expression (11) is not satisfied (NO in step S2302), then the main control unit 102 determines that no face region actually exists at the position of the undetected face estimated by the processing in steps S203 through S209. Then, the processing advances to step S211. In step S211, the main control unit 102 executes control for displaying the face detected by the face detection in step S202 only as the final detection result.

In order to determine the skin-color region with a higher accuracy, the main control unit 102 can execute the determination as follows. The main control unit 102, in addition to the determination that uses the expression (11), can determine whether a variation ratio Rpi, which denotes the ratio of skin-color pixels in the previous frame Img_p and the current frame Img_in, falls within a predetermined range by using the following expression (12). However, in this case, it becomes necessary to maintain the number of skin-color pixels in the previous frame Img_p.

$$thR\_min < Rpi\left(=\frac{Hi}{Hp}\right) < thR\_max \quad (12)$$

where "thR_min" and "thRmax" denote a minimum value and a maximum value of the range of the variation ratio, respectively.

In the present exemplary embodiment, it is determined whether a face region actually exists according to a result of counting the number of skin-color pixels existing around the estimated position of the undetected face. However, the present exemplary embodiment is not limited to this.

More specifically, the main control unit 102 can execute the above-described determination by matching between color histograms for a face region in the previous frame, which are previously stored. Alternatively, the main control unit 102 can execute the above-described determination by template matching on a region around the estimated position of the undetected face by using a face region in the previous frame as a template image.

In addition, in the present exemplary embodiment, it is supposed that the face is the face of a person. Accordingly, in the present exemplary embodiment, the main control unit 102 counts the number of skin-color pixels and executes the determination in step S2301. However, the present exemplary embodiment is not limited to this.

More specifically, if the present invention is implemented by a method for detecting the face of an animal, such as a dog or a cat, the main control unit 102 can extract a representative color around the face region of the image of the animal and can determine the face region based on the extracted representative color. In addition, in the present exemplary embodiment, a face region is to be detected as described above. However, alternatively, a body region of a walking person can be detected instead.

In the present exemplary embodiment, the main control unit 102 determines whether a skin-color region exists at the position of the undetected face estimated by the first and the second exemplary embodiments. Accordingly, the present exemplary embodiment determines whether a face region actually exists. Furthermore, the main control unit 102 determines that the estimated position of the undetected face is appropriate only if it is determined that a face region actually exists as a result of the determination as to whether a skin-color region exists at the undetected face estimated position.

Accordingly, if a person taken in the image starts a sudden motion or if the angle of view of the camera has suddenly changed, it can be prevented to inappropriately estimate a region including no face as a face region.

With the above-described configuration, each exemplary embodiment can estimate the position of a detection target object region with a very high accuracy even if a plurality of object regions of an image has highly mutually different moving amounts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-105672 filed Apr. 30, 2010, which is hereby incorporated by reference herein in its entirety.

What is claimed is:

1. An image processing apparatus comprising:
    an image acquisition unit configured to acquire a plurality of input images which are serially photographed;
    a detection unit configured to detect a plurality of objects from each input image acquired by the image acquisition unit;
    an association unit configured to associate a plurality of objects detected from a past input image with a plurality of objects detected from a current input image;
    a calculation unit configured to, calculate a moving amount for each of the plurality of objects mutually associated between the past input image and the current input image;
    an identification unit configured to identify an undetected object that has been detected from the past input image but has not been detected from the current input image based on a result of association by the association unit;
    a determination unit configured to determine a relationship between moving amounts and sizes of the detected objects based on the calculated moving amount for each of the detected objects and a size thereof;
    a first estimation unit configured to estimate a moving amount of the undetected object based on a size of the undetected object and the determined relationship between moving amounts and sizes of the objects; and
    a second estimation unit configured to estimate a position and a size of an object in the current input image that would be associated with the undetected object in the past input image based on the estimated moving amount of the undetected object.

2. The image processing apparatus according to claim 1, wherein the calculation unit is configured to calculate the movement information for each size of the object region by using a plurality of object regions, which are acquired by dividing the past input image having been associated with the current input image in a horizontal direction, which exist in the same region, and which have approximately the same size.

3. The image processing apparatus according to claim 1, further comprising:
   an extraction unit configured to extract a representative color from the region estimated by the estimation unit; and
   a determination unit configured to determine whether an object region exists in the region estimated by the estimation unit based on the representative color extracted by the extraction unit.

4. The image processing apparatus according to claim 1, wherein the movement information is information about a position in the current input image to which the object region of the past input image has moved and includes either one of a moving direction and a moving amount.

5. The image processing apparatus according to claim 1, wherein the object region is a face region of a person or an animal, or a human body region.

6. The image processing apparatus according to claim 3, wherein the extraction unit is configured to extract the representative color by using pixels included in a predetermined range from a center position of the region estimated by the estimation unit.

7. The image processing apparatus according to claim 3, wherein the object region is a face region of a person, and
   wherein the representative color is a skin color.

8. An image processing method comprising:
   acquiring a plurality of input images which are serially photographed;
   detecting a plurality of objects from each of acquired input images;
   associating a plurality of objects detected from a past input image with a plurality of object regions detected from a current input image;
   calculating, a moving amount of for each of the plurality of objects mutually associated between the past input image and the current input image;
   identifying an undetected object that has been detected from the past input image but has not been detected from the current input image based on a result by the calculating step;
   determining a relationship between moving amounts and sizes of the detected objects based on the calculated moving amount for each of the detected objects and a size thereof;
   a first estimation of a moving amount of the undetected object based on a size of the undetected object and the determined relationship between moving amounts and sizes of the objects; and
   a second estimation of a position and a size of an object in the current input image that would be associated with the undetected object in the past input image based on the estimated moving amount of the undetected object.

9. A non-transitory computer-readable storage medium storing instructions which, when executed by a computer, cause the computer to perform the image processing method according to claim 8.

* * * * *